United States Patent [19]

Suzuki et al.

[11] Patent Number: 5,327,409
[45] Date of Patent: Jul. 5, 1994

[54] MAGNETO-OPTICAL DISC SYSTEM AND MAGNETO-OPTICAL DISC

[75] Inventors: Itaru Suzuki, Miyagi; Hajima Yano, Kanagawa; Hiroyuki Wakasugi; Kaoru Nakajima, both of Miyagi, all of Japan

[73] Assignee: Sony Corporation, Tokyo, Japan

[21] Appl. No.: 951,849

[22] Filed: Sep. 28, 1992

[30] Foreign Application Priority Data

Sep. 30, 1991 [JP] Japan .................................. 3-278628

[51] Int. Cl.⁵ .......................... G11B 7/00; G01J 1/20
[52] U.S. Cl. ................................ 369/44.26; 369/110; 369/13; 250/201.5
[58] Field of Search ............... 369/44.11, 44.15, 44.28, 369/13, 44.27, 112, 44.28, 109, 44.25, 110, 44.32, 275.1-275.5, 44.26; 360/59; 250/201.5

[56] References Cited

U.S. PATENT DOCUMENTS

| | | | |
|---|---|---|---|
| 4,466,035 | 8/1984 | Connell et al. | 360/114 |
| 4,564,877 | 1/1986 | Ezaki et al. | 360/114 |
| 4,855,992 | 8/1989 | Ikegawa et al. | 369/100 |

FOREIGN PATENT DOCUMENTS

0441611A1 8/1991 European Pat. Off. .

OTHER PUBLICATIONS

*Patent Abstracts of Japan*, No. JP2308445, vol. 15, No. 095, Fujitsu Ltd., Dec. 21, 1990.
*Patent Abstracts of Japan*, No. JP1227241, vol. 13, No. 547, Alps Electric Co., Ltd., Nov. 9, 1989.
*Patent Abstracts of Japan*, No. JP1043834, vol. 13, No. 239, Alps Electric Co., Ltd., Feb. 16, 1989.

*Primary Examiner*—Aristotelis Psitos
*Assistant Examiner*—Nabil Hindi
*Attorney, Agent, or Firm*—Hill, Steadman & Simpson

[57] ABSTRACT

A magneto-optical disc system and a medium used therewith are disclosed in which a magneto-optical disk having a magneto-optical recording layer on one major surface with a protective film formed on said magneto-optical recording layer, on which a magnetic head is slid, and an optical system having a focus servo mechanism on the other surface. The focus servo mechanism of the optical system satisfies a certain condition to avoid any focal blank.

2 Claims, 3 Drawing Sheets

MAGNETO-OPTICAL DISC SYSTEM AND MAGNETO-OPTICAL DISC

BACKGROUND OF THE INVENTION

The present invention relates to a magneto-optical disc system for recording information, sliding a magnetic head along a magneto-optical disc, and also relates to the magneto-optical disc used for such a system.

The basic theory of a magneto-optical recording system is that the temperature of a part of a magnetic thin film is raised to a point exceeding the Curie point or the temperature compensating point, so that coercive force of this portion is extinguished, thereby reversing the direction of magnetization into a direction of recording magnetic field applied from outside. This magneto-optical recording system is being utilized in external recording apparatus of an optical file system or a computer and also recording apparatus for sound and image signals, etc.

A typical magneto-optical disc used for this magneto-optical recording system has a magnetization facilitating axis on a transparent substrate which consists of a polycarbonate etc. in a direction perpendicular to a film side, and forms a recording unit by laminating a magneto-optical recording layer (for example, rare earth-transition metal alloy amorphous thin film) having a large magneto-optical effect, a reflective layer, a dielectric layer, etc., thereby irradiating with laser light from the transparent substrate for reading the signals.

Meanwhile, in general, in said magneto-optical recording system an optical system for irradiating with laser light and a magnetic head impressing a magnetic field are both arranged distantly from a magneto-optical disc. However, when a magnetic field modulation system is employed, sliding the magnetic head along the magneto-optical disc is more useful for low magnetic field recording.

This is based on the following reasons. With the magnetic head impressing a high-speed reversal magnetic field, only a very small magnetic field can be generated because of various restrictions. Therefore, the magnetic head needs to be brought as close to the magnetic recording layer as possible, and it is difficult to control the amount of surfacing of the magnetic head minutely and with high precision.

However, in sliding the magnetic head along the magneto-optical disc, problems such as a focal blank (so-called defocusing) caused by a projection of the magneto-optical disc surface are created.

Namely, when the magnetic recording layer of the magneto-optical disc is covered with a protection film consisting of ultraviolet-ray hardened resin etc., the magnetic head is to slide along the protection film of this magneto-optical disc.

On the other hand, the said protection film is formed by techniques such as spin coat, wherein with the viscosity of ultraviolet-ray hardened resin being high, a bubble tends to remain in the film, causing defects such as a projection.

If the magnetic head slides along the protection film surface having such a projection, the magnetic head will collide with the projection, causing bending (displacement) of the disc and magnetic head jump.

Bending and magnetic head jump will cause a focal blank and shortage of external magnetic field, respectively, thereby disturbing normal recording/reproduction.

In order to solve said problem, all discs having a projection generated with a bubble may be eliminated. However, it is not realistic because of possible deterioration of manufacturing yield.

OBJECT AND SUMMARY OF THE INVENTION

An object of the present invention is to provide a magneto-optical disc system capable of presenting capability of a focal servo mechanism or a permissible range of the size of the projection of the protection film surface, canceling a focal blank and magnetic field shortage, and performing good recording/reproduction.

Another object of the present invention is to provide a magneto-optical disc, having no projection which causes a focal blank, and also being satisfactory even in respect of manufacturing yield.

The present inventors theoretically considered the bending of the disc and head jump caused by the collision of the magnetic head with the projection formed on the protection film surface, focusing on the amount of change and preservation of movement with a model of a pressurized spring system. Further, the present inventors then carried out verification of the above consideration by experiment.

As the result, it became clear that said projection has a permissible range in height and radius, within which a focal blank etc. does not happen.

The present invention has been proposed on the basis of said result, comprising a magneto-optical disc having a magneto-optical recording layer on a major surface thereof with a protection film covering said magneto-optical recording layer, a magnetic head sliding along the magneto-optical disc, a focus servo mechanism, and an optical system placed on the other surface of the magneto-optical disc, with a focus servo mechanism thereof satisfying the following formula 1.

$$\frac{2hV_x^2}{r^2\left(1+\frac{1}{4}\cdot\frac{m_D}{m}\right)} < 4\pi^2 \cdot y \times 10^{-5} \cdot f_c^2 \qquad \text{[Formula 1]}$$

h: height of the projection on the protection film surface (m)
r: radius of the projection on the protection film surface (m)
$m_D$: mass of the magneto-optical disc (kg)
m: mass of the magnetic head (kg)
Vx: linear-velocity (m/second)
fc: servo zone (Hz)
y: focal depth of the object lens (μm)

Moreover, the second invention of the present invention is intended to specify a permissible range of a projection in case a servo zone and focal depth of an object lens in a focal servo mechanism of an optical system have been decided. According to the present invention, there is provided a magneto-optical disc comprising a magneto-optical recording layer on a major surface thereof with a protection film covering said magneto-optical recording layer, along which a magnetic head is sliding, and an optical system having a focus servo mechanism on the other surface, wherein no projection which does not satisfy said formula 1 exists on the protection film surface.

If the magnetic head is sliding along the protection film having a projection on the surface thereof, the magnetic head will collide with the projection, thereby vibrating or displacing the magneto-optical disc.

If acceleration of vibration of the magneto-optical disc is large at this time, the optical system cannot follow vibration, causing a focal blank.

Said formula 1 shows the limit out of which this focal blank happens. If the servo zone of the focus servo mechanism, focal depth of the object lens and the size of the projection of the protection film surface of the magneto-optical disc are set within said limit, the focal blank will be avoided.

On the contrary, when the servo zone of the focus servo mechanism and focal depth of the object lens, etc. have been decided, the permissible limit of height and aspect ratio (height/radius) of the projection on the protection film surface of the magneto-optical disc is shown. Thus, since the projection of the protection film surface is within the limit, the manufacturing yield is secured in a practical range.

According to the present invention, it is possible to cancel the focal blank, magnetic-field shortage, etc., since the permissible range of the servo zone in the focus servo mechanism and focal depth of the object lens, and the size of the projection of the protection film surface have been made clear. Thereby, the magneto-optical disc system capable of always performing good recording/reproduction can be provided.

In addition, the servo mechanism of the magneto-optical disc system can be simplified within said limit, and it is very useful for miniaturization of apparatus and reduction in prices.

On the other hand, as for the magneto-optical disc, the permissible height and radius of the projection in accordance with the system are made clear. Namely, even when a certain projection exists, if it is within the permissible range, the magneto-optical disc can be used without hindrances, thereby improving the manufacture yield sharply. This is very advantageous in providing a magneto-optical disc at a low price.

BEST MODE FOR EMBODYING THE INVENTION

Figure 1:
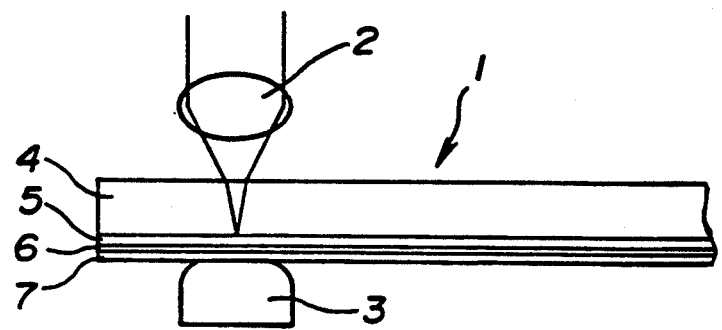
FIG. 1 is a schematic view showing the outline composition of a magneto-optical disc system.

Referring to the drawings and results of the experiment, concrete embodiments of the present invention will be explained hereinafter.

FIG. 1 shows an example of a magneto-optical disc system to which the present invention is applied. In this magneto-optical disc system, an optical pickup 2 which is an optical system for irradiating with laser light is arranged opposite to a magnetic head 3 for impressing an external magnetic field, with a magneto-optical disc 1 placed between them.

Figure 2:
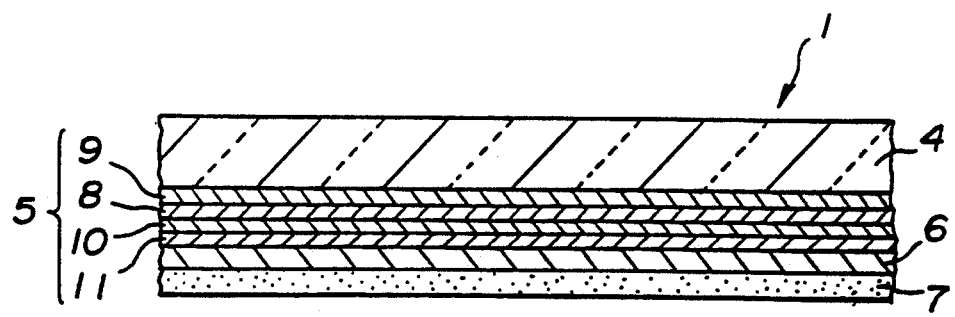
FIG. 2 is a principal portion cross-sectional view showing an example of structure of the magneto-optical disc.

In the magneto-optical disc 1, as shown in FIG. 2, a recording unit 5 is formed on a major surface of a substrate 4. The surface of this recording unit 5 is covered with a protection film 6 consisting of ultraviolet-ray hardened resin and a wear-resistance protection film 7. Meanwhile, the wear-resistance protection film 7 may be omitted.

The substrate 4 is a transparent disc with a thickness of a few millimeters, for example 1.2 mm, consisting of plastic material, such as acrylics resin, polycarbonate resin, polyolefine resin, epoxy resin, and also glass.

In addition, a guiding slot (groove) having a depth of about $\frac{1}{8}$ of wavelength of laser light to be used at the time of reproduction, and an address code pit, not shown, are usually established on the surface of the substrate 4 having the recording unit 5.

The recording unit 5 comprises a 4-layer structure of a magneto-optical recording layer 8, dielectric layers 9 and 10, and a reflection film 11, in the order of the first dielectric layer 9, the magneto-optical recording layer 8, the second dielectric layer 10, and the reflection film 11, accumulated on the substrate 4.

The first dielectric layer 9 and the second dielectric layer 10 comprising transparent oxide material and nitride object material are usually formed of silicon nitride which may be penetrated by laser light without penetration by oxygen and moisture, and nitride aluminum.

The magneto-optical recording layer 8 is an amorphous magnetic thin film having a magnetization facilitating axis in a direction perpendicular to the film. It is desirable that the magneto-optical layer 8 has excellent magneto-optical properties, large coercive force at a room ambient temperature, and the Curie point at around 200 degrees C.

For recording material fitting these conditions, a rare transition metal alloy amorphous thin film, particularly a TbFeCo amorphous thin film, is suitable. For the purpose of raising corrosion resistance, additional elements, such as Cr, may be added to these recording material.

It is desirable to compose the reflection layer 11 of a film having a high reflection rate reflecting 70% or more of laser light on the boundary with the second dielectric layer 10, for example deposition film of non-magnetic metal. Moreover, aluminum is suitable for this reflection layer 11 since it is a thermally right conductor, easy to obtain and be formed into a film.

The protection film 6 is prepared for the purpose of flattening and mechanical protection of the surface of the recording unit 5, comprising acrylic ultraviolet-ray hardened resin and having a thickness of 3 to 5 μm.

The wear-resistance protection film 7 is prepared for the purpose of preventing the wear caused by the sliding of the magnetic head 3 and of securing of transit of the magnetic head 3. Therefore, the wear-resistance protection film 7 consists of hardened films, such as thermally hardened resin, and electronic-line hardened resin, ultraviolet-ray hardened resin. Lubricating powder (such as carbon black, graphite powder, and polytetrafluoroethylene powder) and polish material (such as alumina powder, chromium oxide powder, various magnetic powder) may be added to this wear-resistance protection film 7.

The foregoing is the basic structure of the magneto-optical disc 1. In the present embodiment, when carrying out magnetic field modulation recording, the magnetic head 3 is slid along the protection film 6 or the wear-resistance protection film 7, thereby colliding with the projection formed on the surface of the protection film 6 or the wear-resistance protection film 7.

Hereinafter, acceleration produced to the magneto-optical disc 1 by collision between the projection and the magnetic head 3, and strength (which may also be described by acceleration) of the servo of the optical pickup 2 are compared, whereby the permissible limit of the size of the projection on the surface of the protection film 6 (or the wear-resistance protection film 7) can be found.

First, acceleration αD produced to the magneto-optical disc 1 by the collision between the magnetic head 3 and the projection can be found from the following formula 2.

$$a_D = \frac{V_D}{\Delta t} \quad \text{[Formula 2]}$$

Δt represents a time which the magnetic head 3 takes to reach the summit of the projection from its running aground on the projection, when passing on the projection at a linear-velocity Vx. Δt can be found from the following formula 3 by radius r of the projection and the linear-velocity Vx.

$$\Delta t = \frac{r}{V_x} \quad \text{[Formula 3]}$$

Moreover, VD is a speed (a speed in a downward direction in FIG. 1) produced to the magneto-optical disc 1 by the collision between the magnetic head 3 and the projection. With the speed of the magnetic head 3 (a speed in a downward direction in FIG. 1) being Vs, the following formula 4 will be realized by the principle of conservation of momentum. The formula 4 is applied here to an outer circle of the magneto-optical disc 1, where the magneto-optical disc 1 is relatively light and the magnetic head 3 is relatively heavy. Therefore, as equivalent of the disc 1 on the out circle is set to be ¼ of the mass of the disc 1, which can be easily found from the relation between the moment of inertia and torque.

$$mV_s + \frac{m_D}{4} \cdot V_D = 0 \quad \text{[Formula 4]}$$

Further, since the sinkage of the magneto-optical disc 1 plus the lift of the magnetic head 3 makes height h of the projection, the formula 5 is realized. Then by substituting the formula 3 for the formula 5, the formula 6 is obtained.

$$\left(\frac{V_s}{2} - \frac{V_D}{2}\right) \cdot \Delta t = h \quad \text{[Formula 5]}$$

$$V_s - V_D = \frac{2hV_x}{r} \quad \text{[Formula 6]}$$

Therefore, by being solving said formulas 4 and 6 simultaneously, speed VD of said magneto-optical disc 1 can be found as the following formula 7. A negative sign is given to the formula 7 here because of the coordinate system of speed taken in a downward direction shown in FIG. 1.

$$V_D = \frac{-2hV_x}{r\left(1 + \frac{1}{4} \cdot \frac{m_D}{m}\right)} \quad \text{[Formula 7]}$$

Acceleration αD produced to the magneto-optical disc 1 by substituting these formulas 3 and 7 for the formula 4 is found as the following formula 8.

$$a_D = \frac{V_x}{r} \cdot \frac{-2hV_x}{r\left(1 + \frac{1}{4} \cdot \frac{m_D}{m}\right)} = -\frac{2hV_x^2}{r^2\left(1 + \frac{1}{4} \cdot \frac{m_D}{m}\right)} \quad \text{[Formula 8]}$$

Next, strength of the servo in the focus servo mechanism of the optical pickup 2 is described by acceleration.

Figure 3:
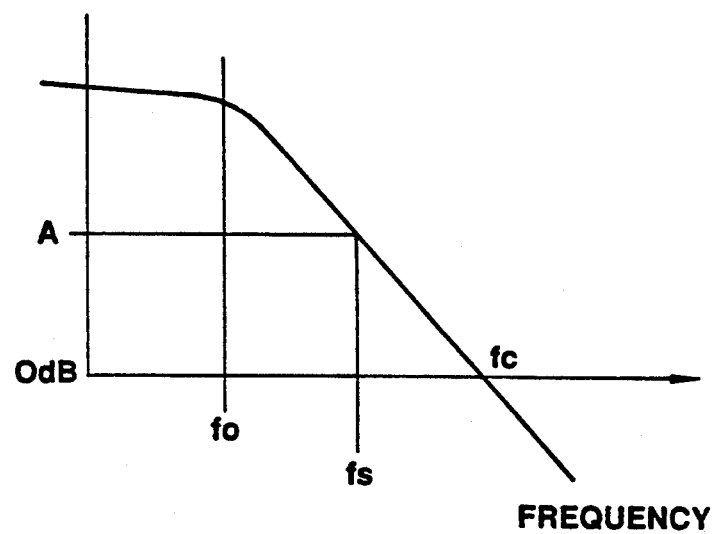
FIG. 3 is a graph showing round transfer properties of a focus servo in an optical system.

FIG. 3 shows the round transfer characteristic of the servo, with fc in the figure representing the servo zone (a frequency at which the profit of the round transfer function of the servo becomes 0 dB). At a frequency higher than f0, the profit of the servo (so-called servo gain) decreases. Therefore, servo gain A of the servo is twice (fc/fs), and since the gain is 0 dB at the time of fs=fc, servo effect may not be expected.

Then, the magnitude of the disturbance at a frequency higher than this needs to be limited within focal depth of an object lens.

Therefore, if the focal depth of the object lens is made y (μm), the permissible maximum magnitude A at any frequency fs higher than f0 will be in the following formula 9.

$$A = y \times 10^{-6} \times \left(\frac{fc}{fs}\right)^2 \ (m) \quad \text{[Formula 9]}$$

Then, by substituting the formula 9 for the following formula 10, x is shown by the formula 11 from the formula 9.

$$x = A \sin(2\pi fs \cdot t) \quad \text{[Formula 10]}$$

$$x = y \times 10^{-6} \times \left(\frac{fc}{fs}\right)^2 \cdot \sin(2\pi fs \cdot t) \quad \text{[Formula 11]}$$

The second differential of this formula 11 represents acceleration, which is shown by the following formula 12.

$$x = 4\pi^2 \cdot y \times 10^{-6} \times fc^2 \cdot \sin(2\pi fs \cdot t) \quad \text{[Formula 12]}$$

Therefore, by comparing maximum accelerations of the permissible disturbance in the formulas 8 and 12, and then making the latter larger than the former, the focal blank may be avoided. Namely, the focal blank may be avoided by satisfying the following formula 13.

$$\frac{2hV_x^2}{r^2\left(1 + \frac{1}{4} \cdot \frac{m_D}{m}\right)} < 4\pi^2 \cdot y \times 10^{-6} \cdot f_c^2 \quad \text{[Formula 13]}$$

h: height of the projection on the protection film surface (m)

r: radius of the projection on the protection film surface (m)

$m_D$: mass of the magneto-optical disc (kg)

m: mass of the magnetic head (kg)

Vx: linear-velocity (m/second)

fc: servo zone (Hz)

y: focal depth of the object lens (μm)

For example, if the servo zone fc and the focal depth y of the object lens are set to be 1 kHz and 1 μm, respectively, the focal blank may be avoided by satisfying the following formula 14.

$$\frac{2hV_x^2}{r^2\left(1+\frac{1}{4}\cdot\frac{m_D}{m}\right)} < 4\pi^2 \qquad \text{[Formula 14]}$$

Figure 4:
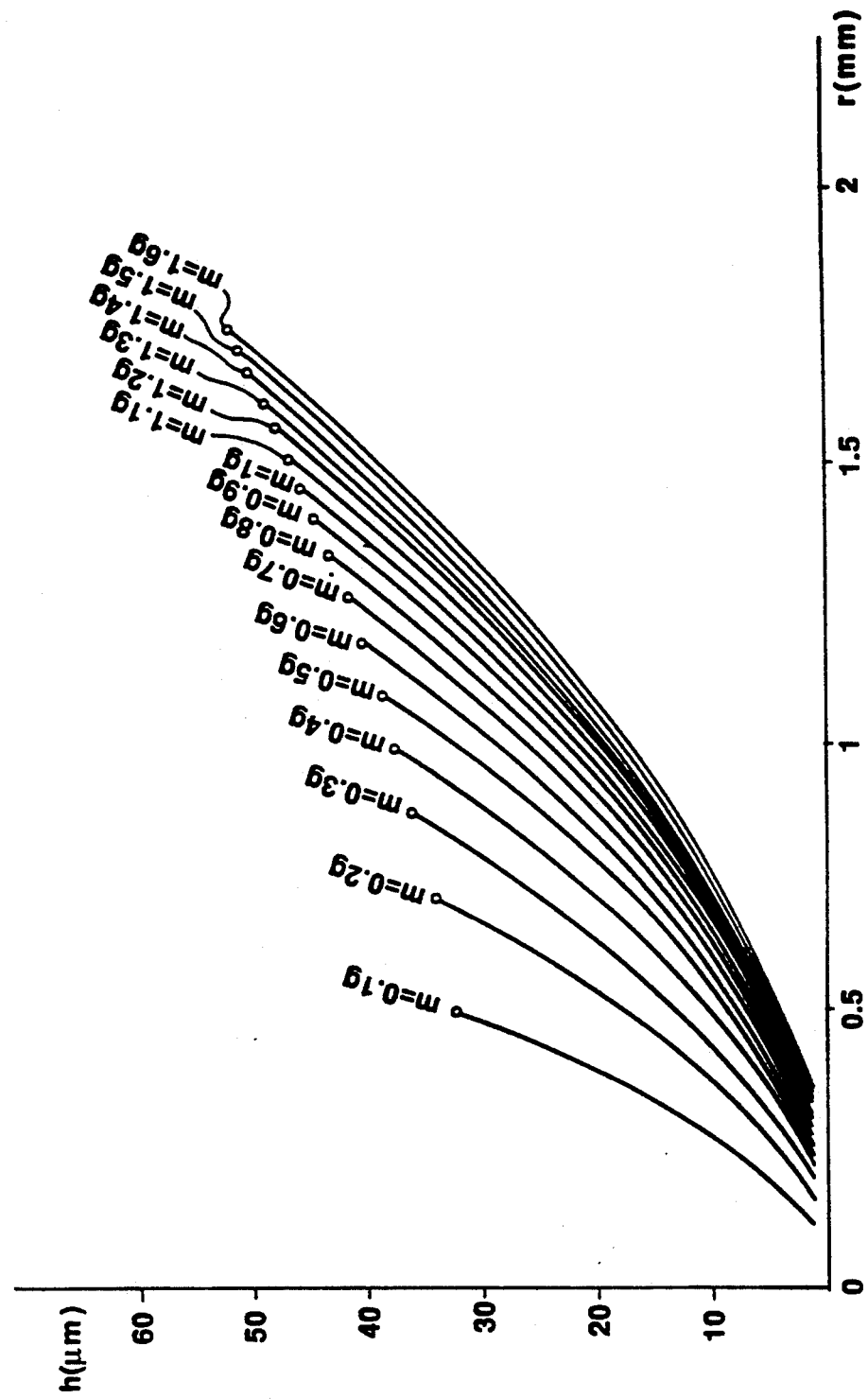
FIG. 4 is a graph showing h-r conditions of a focal blank limit with the mass m of a magnetic head as a parameter.

FIG. 4 shows a graphic of the result of said calculation. This FIG. 4 shows h-r conditions of the focal blank limit with the mass m of magnetic head 3 as a parameter, wherein an area on the right side of the curve is a safe area (an area without a focal blank).

As described hereinabove, by setting up the focal servo mechanism of the optical pickup 2 so that it may satisfy the formula 13, a magneto-optical disc system capable of good recording/reproduction without a focal blank may be provided.

In addition, a magneto-optical disc having no projection which does not satisfy the formula 13 may be selected for use, when the standard of the focal servo mechanism has been decided.

Next, whether said permissible limit is proper is demonstrated by experiment.

In this experiment, the servo zone fc, focal depth y of the object lens, the mass mD of the magneto-optical disc, and linear-velocity Vx are set to be 1 kHz, 1 μm, 4.55×10−3 kg, and 1.4 m/second, respectively.

The mass m of the magnetic head, height h of the projection of the protection film surface, and radius r of the projection in respective examples are shown in Table 1, together with the state of servo error at that time. In the column for the state of servo error, O and X represent a case where a servo error by the focal blank does not exist and a case where a servo error exists, respectively.

TABLE 1

| | mass of the magnetic head (m) g | projection height h (μm) | projection radius r (μm) | state of servo |
|---|---|---|---|---|
| Ex. 1 | 0.2 | 17 | 500 | X |
| Ex. 2 | 0.1 | 17 | 500 | O |
| Ex. 3 | 0.1 | 30 | 1000 | O |
| Ex. 4 | 0.5 | 16 | 500 | X |

TABLE 1-continued

| | mass of the magnetic head (m) g | projection height h (μm) | projection radius r (μm) | state of servo |
|---|---|---|---|---|
| Ex. 5 | 1.0 | 15 | 900 | O |

As is clear from the result of this experiment, the permissible limit shown previously is appropriate.

We claim:

1. A magneto-optical disc system, comprising a magneto-optical disc having a magneto-optical recording layer on one major surface thereof, with a protection film having a projection formed on said magneto-optical recording layer, and an optical system having a focus servo mechanism arranged on the other surface of the magneto-optical disc, characterized in that the focus servo mechanism of the optical system satisfies the following formula 1:

$$\frac{2hV_x^2}{r^2\left(1+\frac{1}{4}\cdot\frac{m_D}{m}\right)} < 4\pi^2 \cdot y \times 10^{-5} \cdot f_c^2 \qquad \text{[Formula 1]}$$

h: height of the projection on the protection film surface (m)

r: radius of the projection on the protection film surface (m)

$m_D$: mass of the magneto-optical disc (kg)

m: mass of the magnetic head (kg)

Vx: linear-velocity (m/second) of the focus servo mechanism relative to the disc fc: servo frequency (Hz)

y: focal depth of the object lens (μm).

2. A magneto-optical disc, comprising a magneto-optical layer on one major surface thereof, with said magneto-optical layer covered by a protection film having a projection, along which a magnetic head is slid, and an optical system having a focus servo mechanism on the other surface, characterized in that no projection which does not satisfy the following formula 1 exists on the protection film surface:

$$\frac{2hV_x^2}{r^2\left(1+\frac{1}{4}\cdot\frac{m_D}{m}\right)} < 4\pi^2 \cdot y \times 10^{-5} \cdot f_c^2 \qquad \text{[Formula 1]}$$

h: height of the projection on the protection film surface (m)

r: radius of the projection on the protection film surface (m)

$m_D$: mass of the magneto-optical disc (kg)

m: mass of the magnetic head (kg)

Vx: linear-velocity (m/second) of the focus servo mechanism relative to the disc fc: servo frequency (Hz)

y: focal depth of the object lens (μm).

* * * * *